(12) United States Patent
Benett et al.

(10) Patent No.: US 6,893,863 B2
(45) Date of Patent: May 17, 2005

(54) PCR THERMOCYCLER

(75) Inventors: William J. Benett, Livermore, CA (US); James B. Richards, Danville, CA (US)

(73) Assignee: The Regents of the University of California, Oakland, CA (US)

( * ) Notice: Subject to any disclaimer, the term of this patent is extended or adjusted under 35 U.S.C. 154(b) by 286 days.

(21) Appl. No.: 10/260,120

(22) Filed: Sep. 27, 2002

(65) Prior Publication Data

US 2003/0036189 A1 Feb. 20, 2003

Related U.S. Application Data

(62) Division of application No. 09/200,309, filed on Nov. 25, 1998, now Pat. No. 6,503,750.

(51) Int. Cl.⁷ .............................................. C12M 1/34
(52) U.S. Cl. ............................. 435/287.2; 435/285.1; 935/88; 422/102
(58) Field of Search ............................. 422/102, 129, 422/240, 241, 131, 82.01; 435/285.1, 287.2, 303.1; 935/88

(56) References Cited

U.S. PATENT DOCUMENTS

| | | | | |
|---|---|---|---|---|
| 4,908,112 A | * | 3/1990 | Pace | 210/198.2 |
| 5,223,747 A | * | 6/1993 | Tschulena | 257/713 |
| 5,345,107 A | * | 9/1994 | Daikoku et al. | 257/717 |
| 5,384,261 A | * | 1/1995 | Winkler et al. | 436/518 |
| 5,589,136 A | * | 12/1996 | Northrup et al. | 422/102 |
| 5,632,957 A | * | 5/1997 | Heller et al. | 422/68.1 |
| 5,726,026 A | * | 3/1998 | Wilding et al. | 435/7.21 |
| 5,829,516 A | * | 11/1998 | Lavochkin | 165/80.4 |
| 6,054,277 A | * | 4/2000 | Furcht et al. | 435/6 |
| 6,524,532 B1 | * | 2/2003 | Northrup | 422/102 |

* cited by examiner

*Primary Examiner*—David A. Redding
(74) *Attorney, Agent, or Firm*—Eddie E. Scott; L. E. Carnahan; Alan H. Thompson

(57) ABSTRACT

A sleeve-type silicon polymerase chain reaction (PCR) chamber or thermocycler having improved thermal performance. The silicon sleeve reaction chamber is improved in thermal performance by etched features therein that reduce thermal mass and increase the surface area of the sleeve for cooling. This improved thermal performance of the thermocycler enables an increase in speed and efficiency of the reaction chamber. The improvement is accomplished by providing grooves in the faces of the sleeve and a series of grooves on the interior surfaces that connect with grooves on the faces of the sleeve. The grooves can be anisotropically etched in the silicon sleeve simultaneously with formation of the chamber.

17 Claims, 3 Drawing Sheets

PCR THERMOCYCLER

CROSS-REFERENCE TO RELATED APPLICATION

This Application is a division of application Ser. No. 09/200,309 filed Nov. 25, 1998 now U.S. Pat. No. 6,503,750.

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to polymerase chain reaction (PCR) instruments, particularly to a PCR thermocycler, and more particularly to a sleeve-type silicon thermocycler having improved thermal performance.

Most PCR instruments are large bench top systems that can do large numbers of samples, are relatively slow, and use large amounts of electrical power. Recently, efforts have been directed to the development of miniature PCR chambers which utilize so-called sleeve-type silicon reaction chambers involving doped polysilicon for heating and bulk silicon for convective cooling. The sleeve-type reaction chambers are exemplified by U.S. Pat. No. 5,589,136 issued Dec. 31, 1996, as well as copending U.S. application Ser. No. 08/489,819, filed Jun. 13, 1995, entitled "Diode Laser Heated Micro-Reaction Chamber With Sample Detection Means," and U.S. application Ser. No. 08/763,465, filed Dec. 11, 1996, entitled "Microfabricated Sleeve Devices for Chemical Reactions," each assigned to the same assignee.

The present invention provides an improved or advanced sleeve-type silicon PCR chamber by reducing the thermal mass and increasing the surface area of the sleeve for cooling, thereby increasing the speed and the efficiency thereof. This is carried out by etching grooves along the faces of the sleeve and etching a series of grooves on the interior surfaces that connect with the face grooves. The grooves are anisotropically etched in the silicon wafers simultaneously with the formation of the chamber features of the sleeve, such that the inside grooves are etched with the chamber, but the outside grooves are etched separately.

SUMMARY OF THE INVENTION

It is an object of the present invention to provide an improved PCR chamber.

A further object of the invention is to provide a silicon-based sleeve type chemical reactor or thermocycler with improved thermal performance.

A further object of the invention is to modify existing sleeve-type reaction chambers to reduce the thermal mass and increase the surface area for enhanced cooling.

Another object of the invention is to provide an improved microfabricated chemical reactor having a sleeve reaction chamber with a slot therein for introducing reaction fluids, wherein the sleeve reaction chamber is provided with an arrangement of grooves to increase the surface area for more efficient cooling.

Another object of the invention is to provide an advanced silicon PCR chamber or thermocycler having grooves therein to reduce the thermal mass and increase the cooling surface area.

Another object of the invention is to provide an advanced silicon PCR chamber having improved thermal performance resulting from grooves formed in the faces of the device forming the chamber and a series of interior grooves connected to the face grooves for increasing the surface area for cooling.

Other objects and advantages of the present invention will become apparent from the following description and accompanying drawings. Basically, the present invention is a PCR thermocycler with improved thermal performance. The invention involves a modification of the so-called sleeve or sleeve-type reaction chambers, such as exemplified in the above-referenced patent and copending applications. The improved thermal performance of the silicon PCR chamber of the present invention is accomplished by modification of the sleeve to include a groove arrangement in the external faces of the sleeve and on the interior surfaces to provide increased surface area for enhanced cooling. These modifications, accomplished by anisotropically etching simultaneously with the formation of the chamber, increase the speed and efficiency of the silicon sleeve PCR chamber.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention is directed to a PCR thermocycler utilizing a silicon PCR chamber having thermal improvements. The miniature silicon PCR thermocycler utilizing a sleeve reaction chamber, such as described and claimed in above-referenced U.S. Pat. No. 5,589,136 and copending application Ser. Nos. 08/489,819 and 08/763,465, is modified by the present invention to increase the speed and efficiency thereof. This modification involves reducing the thermal mass and increasing the surface area of the silicon sleeve for more efficient cooling. The modification of the silicon sleeve reactor chamber is carried out by forming longitudinally extending grooves on the opposite sides or faces of the sleeve and forming a series of radially extending grooves on the interior surfaces of the sleeve that connect with the longitudinally extending grooves on the faces. The grooves are anisotropically etched in the silicon wafers simultaneously with the features of the silicon reaction chamber.

The grooves on the external faces of the sleeve or device extend along substantially the length of the faces and serve to both remove and thermally isolate material from the heated areas of the reaction chamber within the sleeve. This reduces the amount of the thermal mass of the sleeve that is required to go through the thermal cycle thereby increasing the efficiency. The interior grooves provide a path for air to be forced past the heated surfaces of the chamber during the cooling cycle.

Figure 1:
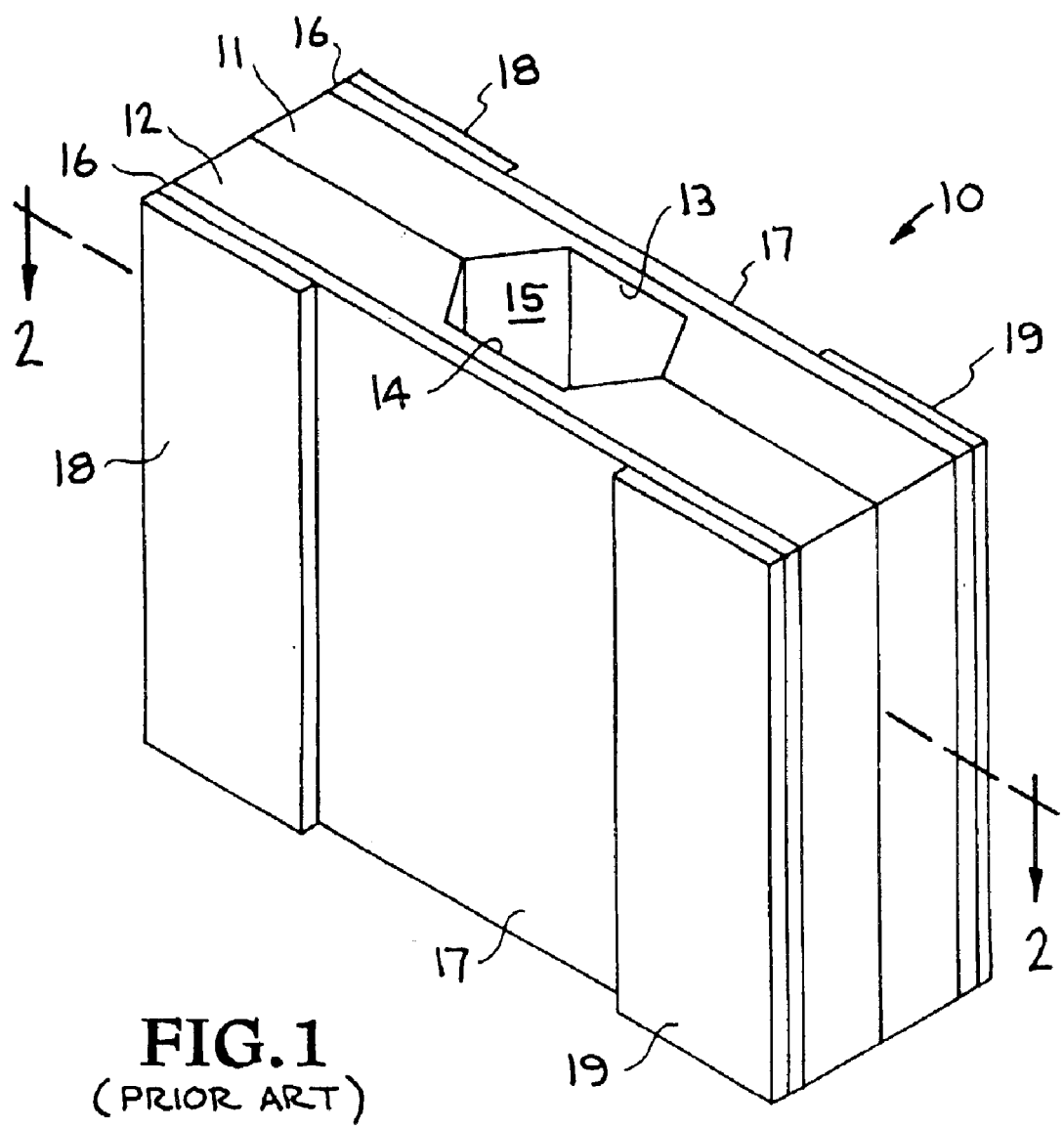
FIG. 1 is a perspective view of an embodiment of a prior art silicon sleeve reaction chamber.
Figure 2:
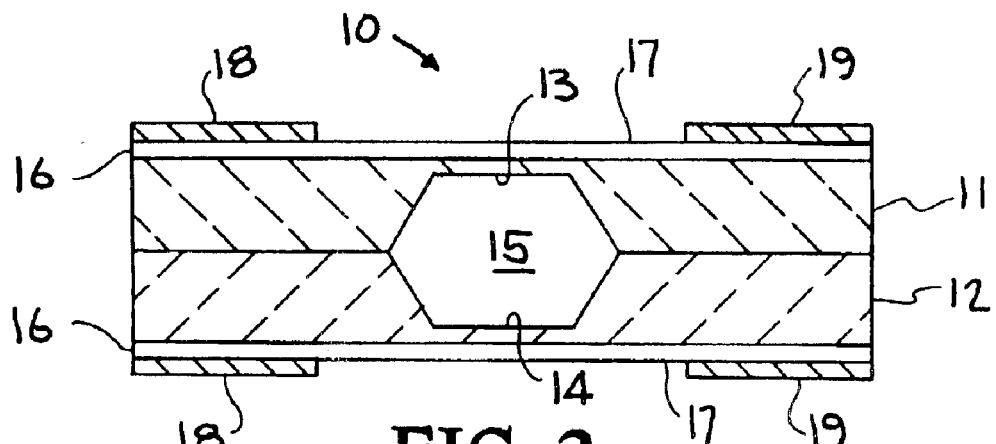
FIG. 2 is an enlarged cross-section taken on the line 2—2 of FIG. 1 showing the electrical contact and polysilicon heater of the silicon sleeve reaction chamber of FIG. 1.

The PCR thermocycler or silicon sleeve reaction chamber of the above-referenced patent and applications is schematically illustrated in FIGS. 1 and 2. The sleeve or device generally indicated at 10 is composed of two body sections 11 and 12 of bulk silicon, each having a cutaway 13 and 14 extending the length thereof to define a slot forming a reaction chamber 15 when the body sections 11 and 12 are bonded or otherwise secured together. Specific embodiments and fabrication details of the sleeve 10 are set forth in the above-referenced patent and copending applications and are incorporated herein by reference thereto to provide an exemplary fabrication description. As seen in FIG. 2, each body section 11 and 12 of the sleeve 10 is provided with a layer 16 of polysilicon with a section 17 forming a heater, which is located adjacent the chamber 15 with an electrical contact layer 18 and 19 on the polysilicon layer 16 to activate the heater sections 17. As shown, the cutaways 13 and 14 each include a flat section and taper wall surface sections, but may be of a different configuration. The flat section of the cutaways 13 and 14 is located adjacent the polysilicon layers 16 via a thin section of bulk silicon of body sections 11 and 12. A single polysilicon heater may be used on each side of the sleeve instead of the plural heater sections 17 located on opposite sides of the sleeve 10, as shown, with appropriate electrical contacts for each heater section. As in the sleeve reaction chamber of the above-referenced patent, a liner or insert may be inserted into the slot, forming the reaction chamber. An embodiment of the improved or advanced PCR thermocycler or silicon PCR chamber of the present invention illustrated in FIGS. 3–4 is generally similar to that of FIGS. 1 and 2, and for simplicity of illustration the polysilicon (heater) layers and electrical contact layers have been omitted, but such are utilized in an actual device incorporating the embodiment of FIGS. 3 and 4, but utilize platinum films rather than doped polysilicon for the resistive heaters.

Figure 3:
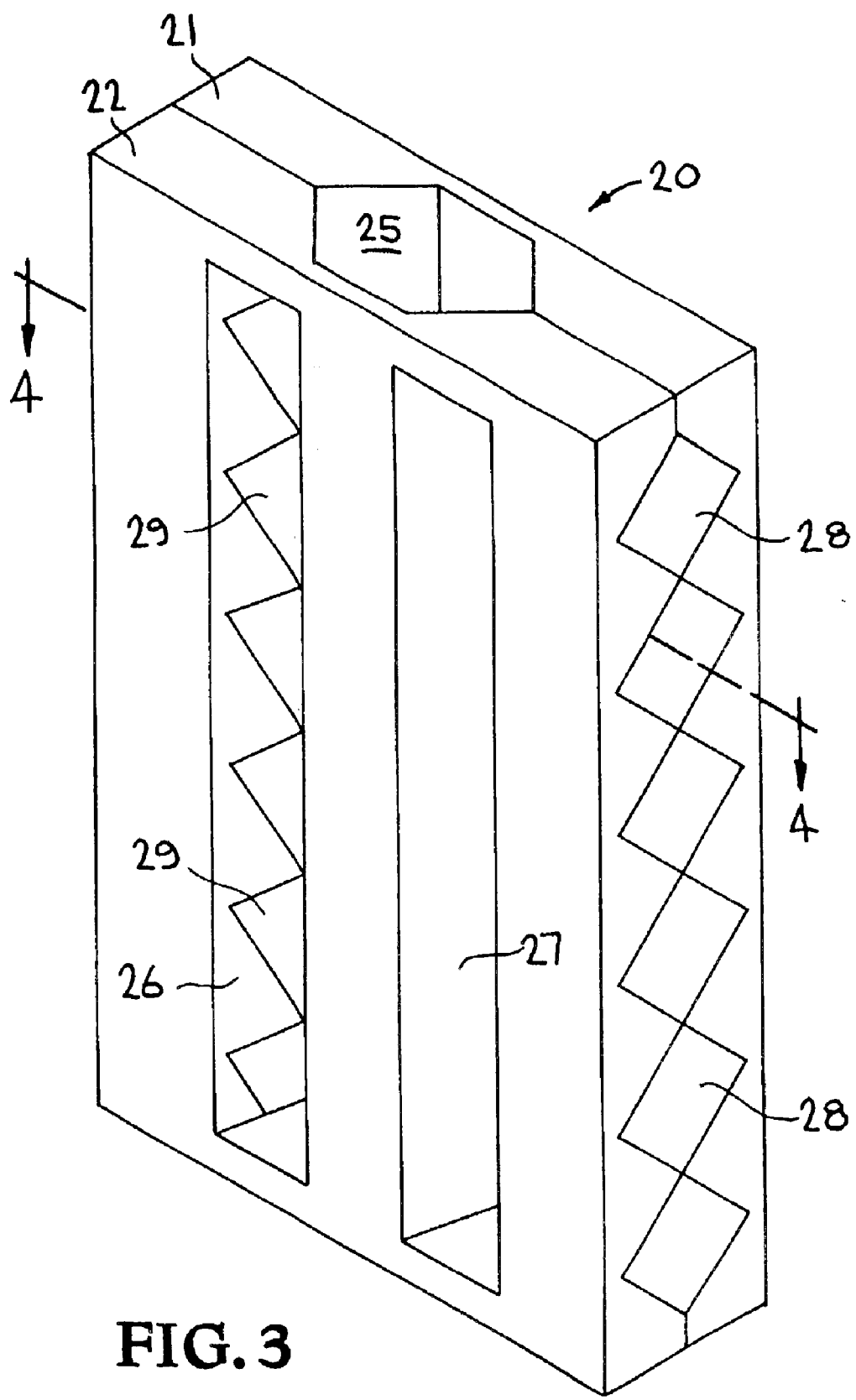
FIG. 3 is a perspective view of an embodiment of the improved silicon sleeve reaction chamber made in accordance with the present invention.
Figure 4:
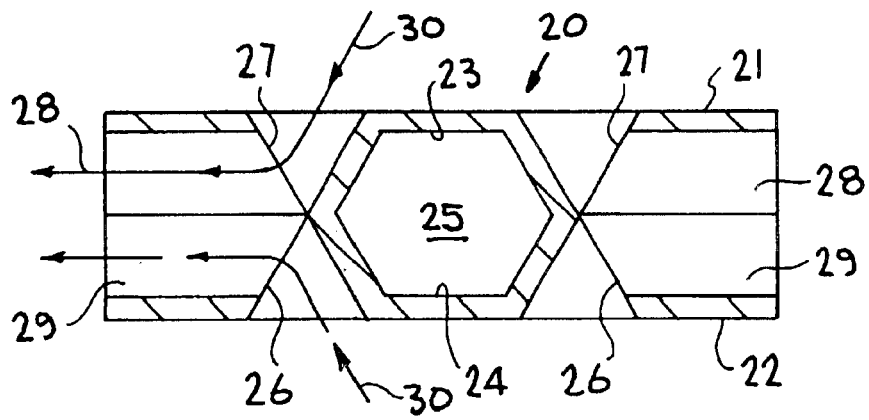
FIG. 4 is an enlarged cross-sectional view taken along the line 4—4 of FIG. 3, and illustrating the interconnecting groove arrangement of the present invention.

As shown in FIGS. 3 and 4, the sleeve reaction chamber generally indicated at 20 is composed of two silicon body members or sections 21 and 22, each having a longitudinally extending cutaway 23 and 24 along the entire length thereof which form a reaction chamber 25 when the body sections 21 and 22 are secured together. A pair of longitudinally extending, spaced, V-shaped grooves 26–27 are formed in the external faces or sides of each of said body sections 21 and 22, but do not extend the entire length of the body sections, as seen in FIG. 3. A series of radially extending, V-shaped grooves 28 and 29 are formed on the inner surfaces of the outer sides of body sections 21 and 22, as seen in FIG. 3, and as seen in FIG. 4, grooves 28 and 29 connect at the inner ends thereof with the V-shaped longitudinally extending grooves 26 and 27 to form air flow passageways as indicated by the arrows 30. As the air flows through the passageways formed by the interconnected grooves 26–27 and 28–29, it removes heat from the surfaces of chamber 25, thereby increasing the speed and efficiency of the sleeve reactor chamber or PCR thermocycler 20. By reduction of the thermal mass of the body sections 21 and 22 and the increase in the surface areas thereof, improved thermal performance is provided.

The grooves 26–27 and 28–29 are anisotropically etched into the silicon wafers during the formation of the body sections or members 21 and 22.

After etching the body members 21 and 22 to form the cutaways 23 and 24, which define the reaction chamber 25, and etching the body members to form the longitudinal extending grooves 26–27, and the series of radially extending grooves 28–29, which form air flow passageways 30, the body members 21 and 22 are secured together, such as by bonding, gluing, spring loading, etc., as known in the art to form the PCP thermocycler or sleeve reaction chamber 25, as shown in FIG. 3.

By way of example, the body sections 21 and 22 or members may have a length of 22.5 mm, width of 4 mm, and depth or thickness of 1 mm. The cutaways 23 and 24 may have a depth of 0.875 mm to 0.925 mm, bottom width of 1.34 mm with the sides tapering at an angle of 54.7°, the etch plane of silicon. The grooves 26 and 27 may have a length of 22 mm to 22.2 mm so as to be shorter than the length of the body members 21 and 22, and are located at a distance of 0.05 mm to 0.25 mm from the edges of the body members, spaced a distance of 2 mm to 1.15 mm from each other on the side surfaces of the body member, an outer width of 1.2 mm to 1.4 mm, a depth of 0.895 mm to 0.980 mm, and cut at an angle of 54.7° which is the etch plane of silicon. The grooves 28–29 may be spaced from one another by a distance of 0.05 mm to 0.175 mm, have a length of 1.70 mm to 1.75 mm, an outer width of 1.24 mm, and cut at an angle of 54.7°. The outer most of the series of grooves 28–29 are located a distance of 0.760 mm to 0.77 mm from the ends of body members 21 and 22.

The angle of the tapered surfaces of the silicon body members is determined by the etching process of the cutaways and grooves, the physical characteristics of the silicon, etc., as well known in the current silicon micromachining technology.

Figure 5:
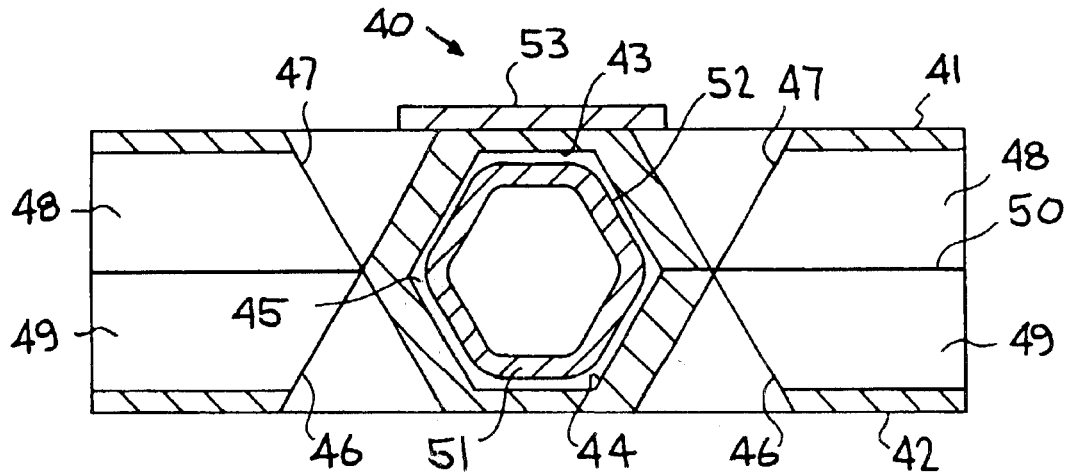
FIG. 5 is an enlarged cross-sectioned view of another embodiment wherein an air gap is provided between the sleeve reaction chamber and an insert therein.
Figure 6:
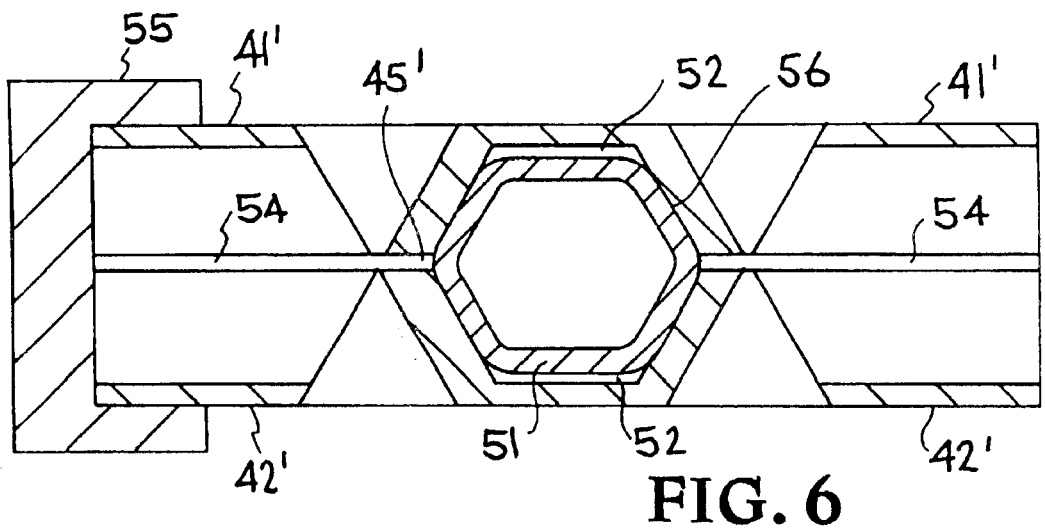
FIG. 6 is an enlarged cross-sectioned view of the sleeve reaction chamber but, wherein spring loaded electrical contacts clamp the two halves of the chamber together.

FIGS. 5 and 6 illustrate embodiments of the thermocycler wherein an air gap is formed between the thermocycler and an insert therein, and wherein the two halves of the FIG. 6 embodiment are clamped together rather than bonded as in the FIG. 5 and FIGS. 3–4 embodiment.

As pointed out above, the heater and electrical contactors as shown in FIG. 2, were eliminated for simplicity and platinum films are used both as the resistive heater and as a temperature sensor on the device. The old design (FIG. 2) used doped polysilicon for resistive heaters and required an external temperature sensor such as a thermocouple or thermistor. Platinum can be used as a temperature sensor because of it high temperature coefficient of resistance. Because the film is part of the device, this system of temperature measurement is extremely accurate and has very fast response. The platinum heater is in the form of a thin line that runs over the surfaces to be heated. The thickness, width, and length of the line can be varied to achieve the required resistance. The platinum resistors can be deposited using a shadow mask and standard thin film deposition methods to create the pattern. The FIG. 5 embodiments include exemplary platinum films as a resistive heater and temperature sensor.

Referring now to FIG. 5, the PCR thermocycler or sleeve reaction chamber, generally indicated at 40 is composed of two silicon body members 41 and 42, each having a longitudinally extending cutaway 43 and 44 which form a reaction chamber 45. A pair of longitudinally extending spaced grooves 46–47 are formed in the internal faces of each body member 41 and 42, as in FIG. 3. A series of radially extending grooves 48 and 49 are formed on the inner surfaces of the outer sides of body members 41 and 42, as in FIG. 3, whereby grooves 48 and 49 are in contact with grooves 46 and 47 to form air flow passageways as shown in FIG. 4, the body members 41 and 42 being bonded together as indicated at 50. Chamber 45, is provided with an insert or sample container 51, an air gap indicated at 52 is located between insert 51 and the walls of members 41 and 42 forming chamber 45. A platinum film resistive heater is shown at 53.

A significant part of the thermal resistance of the PCR thermocycler system is the air gap between the thermocycler and the insert.

In the embodiments where the two halves of the device are bonded together, the chamber was sized to allow the insert to slide into the chamber without damaging it. This type of fit means that there is some amount of air between the thermocycler wall and the insert, as shown in FIG. 5.

Spring loading the two halves or body members of the thermocycler together, instead of bonding, allows the chamber cavity to be sized for a tighter fit. This allows the insert to push between the two halves as it is inserted into the chamber, with the end result being that the insert is clamped between the two halves of the thermocycler, thus eliminating portions of the air gap, as in seen in FIG. 5, and insuring good thermal contact.

The spring loading or clamping approach is shown in FIG. 6, which is similar in construction to FIG. 5, and thus corresponding component will be provided similar reference numerals. Referring now to FIG. 6, a space indicated at 54 is shown between the two halves or body members 41' and 42', and the width of the space 54 is determined by a spring loaded clamp generally indicated at 55, (only one shown) which is opened (loosened) sufficiently for insertion of the insert 51 into chamber 45', whereafter the clamp 55 is tightened so that members 41' and 42' are in contact, eliminating the space 54 and the insert 51 is clamped therebetween and against the chamber wall as indicated at 56. The spring loaded clamps, such as 55, may also function as electrical contacts for the thermocycler, wherein the electrical contacts are located a the out ends of members 41' and 42' as shown in the FIG. 2 (prior art) embodiment.

It has thus been shown that the present invention provides a thermally improved PCR thermocycler or sleeve reaction chamber by providing longitudinally extending grooves and a series of interconnecting radially extending grooves, which reduce the thermal mass and increase the surface area of the sleeve for increased cooling efficiency and speed. The micromachined silicon thermocycling chamber of the present invention enables a PCR instrument that is small, portable, and fast, and thus provides additional applications and uses, such as for biological warfare agent detection, DNA analysis, etc. The number and shape of the grooves may vary depending on the desired application and the etching process, and such shape is not critical since the purpose of the grooves is to reduce thermal mass and increase cooling surface area.

While a particular embodiment of the invention, along with specific numbers of grooves and their configuration, have been illustrated and described, such are not intended to be limiting. Modifications and changes may become apparent to those skilled in the art, and it is intended that the invention be limited only by the scope of the appended claims.

What is claimed is:

1. A microfabricated chemical reactor apparatus, comprising:
    a sleeve that forms a reaction chamber, said sleeve having at least one external surface and at least one internal surface,
    a plurality of grooves in said sleeve, said plurality of groves including
    at least one longitudinally extending groove on said at least one external surface of said sleeve and
    at least one radially extending groove on said at least one internal surface of said sleeve,
    wherein said at least one longitudinally extending groove and said at least one longitudinally extending groove reduces thermal mass and increases surface area of said sleeve reaction chamber.

2. The microfabricated chemical reactor apparatus of claim 1, wherein said at least one longitudinally extending groove, and said at least one radially extending groove are connected to form a passageway there-through.

3. The microfabricated chemical reactor apparatus of claim 1, wherein said plurality of grooves includes at least one longitudinally extending groove on opposite sides of said sleeve, and at least one radially extending groove connected to each of said longitudinally extending grooves to form passageways there-through.

4. The microfabricated chemical reactor apparatus of claim 3, wherein two longitudinally extending grooves are located on opposite sides of said sleeve, and wherein said plurality of connecting radially extending grooves are located along opposite end sections of said sleeve.

5. The microfabricated chemical reactor apparatus of claim 4, wherein each of said grooves is of a V-shaped configuration.

6. The microfabricated chemical reactor apparatus of claim 5, wherein said sleeve is constructed of silicon.

7. The microfabricated chemical reactor apparatus of claim 1, wherein said sleeve reaction chamber is composed of two sections, said sections being bonded or clamped together.

8. The microfabricated chemical reactor apparatus of claim 7, wherein said two sections are configured to define a chamber to enclose an insert therebetween such that said insert is in direct contact with at least a portion of walls of said two sections defining the chamber or spaced from the walls of said two sections defining the chamber.

9. A microfabricated chemical reactor apparatus, comprising:
    an elongated sleeve that forms a silicon-based sleeve reaction chamber, said elongated silicon-based sleeve reaction chamber
    having at least one external surface and
    having at least one internal surface,
    a plurality of longitudinally extending grooves on said at least one external surface of said silicon-based elongated sleeve reaction chamber and
    a plurality of radially extending grooves on said at least one internal surface of said elongated silicon-based sleeve reaction chamber,
    wherein said plurality of longitudinally extending grooves on said at least one external surface of said elongated silicon-based sleeve reaction chamber and wherein said a plurality of radially extending grooves on said at least one internal surface of said elongated silicon-based sleeve reaction chamber reduces thermal mass and also increases cooling surface area of said elongated silicon-based sleeve reaction chamber.

10. The microfabricated chemical reactor apparatus of claim 9, wherein said plurality of grooves include interconnected sections to define passageways in said sleeve.

11. The microfabricated chemical reactor apparatus of claim 10, wherein said plurality of grooves include at least one longitudinally extending groove and at least one radially extending groove connected to said at least one longitudinally extending groove.

12. The microfabricated chemical reactor apparatus of claim 11, wherein at least one longitudinally extending groove is located on opposite sides of said sleeve.

13. The microfabricated chemical reactor apparatus of claim 12, wherein at least one radially extending groove is located in opposite end sections of said sleeve.

14. The microfabricated chemical reactor apparatus of claim 13, wherein two longitudinally extending grooves are located in spaced relation on each side of said sleeve.

15. The microfabricated chemical reactor apparatus of claim 9, wherein said sleeve is composed of two body sections, and wherein said slot is formed by a cutaway in each of said body sections, and wherein the microfabricated chemical reactor apparatus comprises said plurality of longitudinally and radially extending grooves being located in each of said body sections.

16. The microfabricated chemical reactor apparatus of claim 15, wherein said plurality of grooves includes at least one longitudinally extending groove in a surface opposite said cutaway and in spaced relation from said cutaway, and includes a series of radially extending grooves in the same surface as said cutaway and in spaced relation to said cutaway.

17. The microfabricated chemical reactor apparatus of claim 9, including a heater and temperature sensors formed of a platinum film.

* * * * *